United States Patent
DeCurtis

(10) Patent No.: US 10,932,089 B1
(45) Date of Patent: Feb. 23, 2021

(54) BEACON READER WITH REDUCED NETWORK DATA TRAFFIC

(71) Applicant: DeCurtis LLC, Orlando, FL (US)

(72) Inventor: David DeCurtis, Windermere, FL (US)

(73) Assignee: DeCurtis LLC, Orlando, FL (US)

(*) Notice: Subject to any disclaimer, the term of this patent is extended or adjusted under 35 U.S.C. 154(b) by 0 days.

(21) Appl. No.: 16/875,416

(22) Filed: May 15, 2020

(51) Int. Cl.
*H04W 4/02* (2018.01)
*H04W 4/029* (2018.01)
*G06K 17/00* (2006.01)
*H04W 4/80* (2018.01)

(52) U.S. Cl.
CPC ........ *H04W 4/023* (2013.01); *G06K 17/0022* (2013.01); *H04W 4/029* (2018.02); *H04W 4/80* (2018.02)

(58) Field of Classification Search
CPC ....... H04W 4/023; H04W 4/029; H04W 4/80; H04W 4/02; H04W 40/244; G06K 17/0022; G06K 7/10475; G06Q 20/4015; G07C 2209/63; G08B 13/1427; G08B 13/2462
USPC ...................... 340/8.1, 539.13, 539.32, 572.1
See application file for complete search history.

(56) References Cited

U.S. PATENT DOCUMENTS

| | | | | |
|---|---|---|---|---|
| 5,742,237 A * | 4/1998 | Bledsoe | ............. | G06Q 10/06 340/8.1 |
| 6,738,628 B1 * | 5/2004 | McCall | ............. | G01S 1/68 340/8.1 |
| 8,849,205 B2 | 9/2014 | Desai et al. | | |
| 8,862,067 B2 | 10/2014 | Un et al. | | |
| 9,357,342 B2 | 5/2016 | Viswanadham et al. | | |
| 9,418,531 B2 | 8/2016 | Basalamah et al. | | |
| 9,774,985 B2 | 9/2017 | Weizman et al. | | |
| 10,037,642 B2 | 7/2018 | Padgett et al. | | |
| 10,045,184 B2 | 8/2018 | Padgett et al. | | |
| 10,049,516 B2 | 8/2018 | Padgett et al. | | |
| 10,157,514 B2 | 12/2018 | Padgett et al. | | |
| 10,171,978 B2 | 1/2019 | Padgett et al. | | |
| 10,304,271 B2 | 5/2019 | Padgett et al. | | |
| 10,499,228 B2 | 12/2019 | Padgett et al. | | |
| 2002/0196126 A1 * | 12/2002 | Eisenberg | ............. | G06K 17/00 340/10.2 |
| 2004/0080412 A1 * | 4/2004 | Smith | ............. | H04W 64/00 340/539.13 |
| 2009/0088183 A1 * | 4/2009 | Piersol | ............. | H04W 64/003 455/456.1 |

(Continued)

*Primary Examiner* — Edwin C Holloway, III

(57) ABSTRACT

Systems, methods, and computer-executable instructions for reducing network traffic from a beacon reader including storing a previous distance of a beacon from the beacon reader determined based on a previous read delay period of time. the beacon reader detects two or more beacon information from the beacon during a read delay period of time. A distance between the beacon reader and the beacon for each of the two of more beacon information is determined. An average distance based on the determined distances between the beacon reader and the beacon for each of the two or more beach information is determined. A distance moved from the average distance and the previous distance of the beacon is determined. The distance moved is greater than a predetermined distance threshold. A beacon identifier is transmitted to a remote server based on the distance moved being greater than the predetermined distance threshold.

20 Claims, 6 Drawing Sheets

(56) References Cited

U.S. PATENT DOCUMENTS

| | | | |
|---|---|---|---|
| 2014/0122148 A1* | 5/2014 | Padgett | G06Q 50/12 705/7.15 |
| 2015/0154844 A1* | 6/2015 | Skaaksrud | G06F 19/3418 340/539.13 |
| 2016/0026837 A1* | 1/2016 | Good | G06Q 50/22 340/539.13 |
| 2016/0183042 A1 | 6/2016 | Weizman et al. | |
| 2016/0373893 A1 | 12/2016 | Khanna et al. | |
| 2018/0160269 A1* | 6/2018 | Baarman | G06Q 50/12 |
| 2020/0059774 A1 | 2/2020 | Padgett et al. | |

* cited by examiner

BEACON READER WITH REDUCED NETWORK DATA TRAFFIC

BACKGROUND

Location services use beacon readers to read beacon information transmitted from beacons. An individual beacon reader is able to determine a distance to the beacon, but is unable to determine the beacon's specific location. Location services collect data from multiple beacon readers, each detecting the same beacon, to determine the beacon's location. A beacon may transmit its beacon information multiple times each second. For example, common protocols, such as iBeacon and Eddystone, have beacons transmit beacon information ten times each second. As a location service may be detecting thousands of beacons using thousands of readers, the amount of data transmitted over a network may quickly reach network saturation, which may cause increased latency and responsiveness.

DETAILED DESCRIPTION

Beacon information transmitted from beacons is relatively lightweight. For example, a 30 byte packet, e.g., beacon information, may be transmitted from a beacon. This packet may be transmitted multiple times each second. As an example, some protocols have the beacon information transmitted ten times each second. In a proximity based location system, multiple beacon readers detect a transmission from a beacon. The beacon information from each of detected readers may be transmitted to a location service that uses the beacon information and the location of the readers that detected the beacon information to calculate a location of the detected beacon. While the beacon information is lightweight, the number of transmissions per second and multiple readers detecting the same transmission, the amount of data transferred over a network to a location service can reach as much as 150 megabits per second of beacon information or more. This does not include the typical overhead of transmitting the beacon information from transport protocols. Such a large amount of transmitted data can easily overwhelm a network. Accordingly, a beacon reader that selectively transmits data, thus reducing the data transmission load, would be beneficial in reducing the amount of data traffic on a network. Beacon readers, however, still should transmit detected beacons in a way that the location service may quickly determine a location of a beacon.

Figure 1:
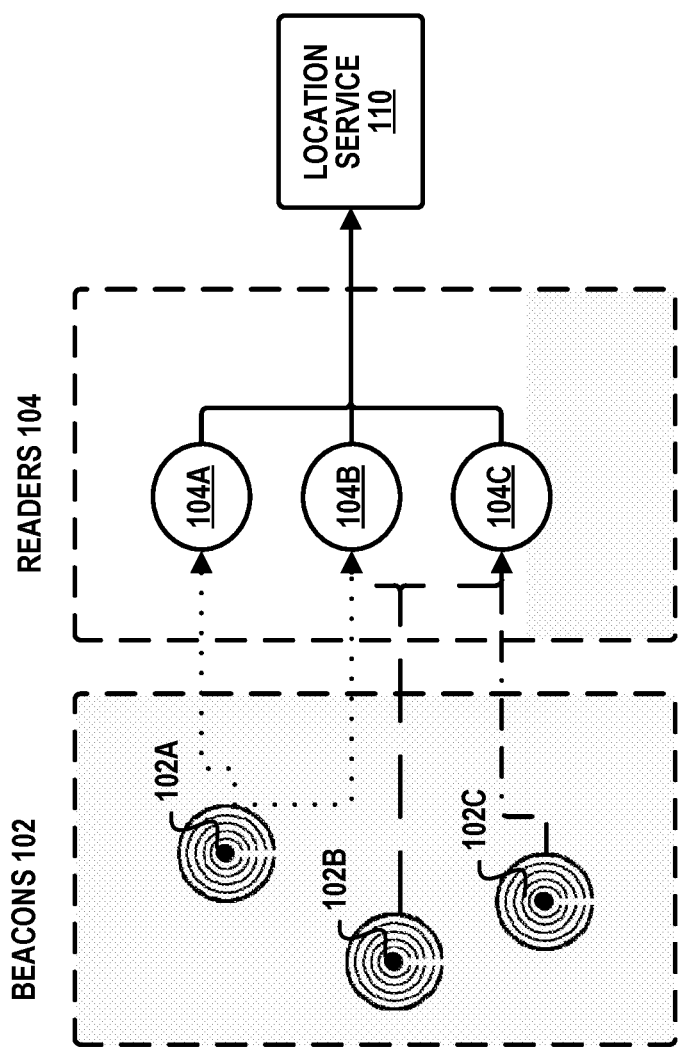
FIG. 1 is a system diagram of a location service system in accordance with respective examples.

FIG. 1 is a system diagram of a location service system in accordance with respective examples. The system includes beacons 102 and beacon readers 104 that are part of a proximity system that provides proximity information to a location service 110. Beacons 102A, 102B, 102C may be carried by individuals or attached to objects such as luggage, equipment, etc. The beacons 102A, 102B, 102C advertise their presences by broadcasting beacon information to readers 104A, 104B, 104C. In an example, the readers 104A, 104B, 104C, detect beacons using Bluetooth Low Energy (BLE). The beacon information may be continuously broadcast from the beacons 102A, 102B, 102C. The beacon information may include a beacon identifier and a transmission strength. The readers 104A, 104B, 104C detect the beacon information from one or more of the beacons 102A, 102B, 102C. Individually, the readers 102A, 102B, 102C are able to determine a distance between the reader and the detected beacon. The reader, however, is not able to determine a position of the beacon. Accordingly, the reader is able to detect advertised beacon information from beacons that are in the proximity of the readers.

Beacon information, or a portion of beacon information, along with potentially the proximate distance between a reader and a beacon may be sent to a location service 110. The location service 110 is able to use beacon information related to the same beacon, e.g., 102B, from multiple readers, e.g., 104B and 104C, to calculate a position or location of the beacon. For example, the location service 110 may use triangulation based on beacon information from three or more different readers. The location service 110, therefore, is able to determine a position of the beacon 102A. The position may be used to derive additional location information. In various examples, the location service 110 may provide location information to an application (not shown). The location service 110 may include a location engine that may be used to determine a position of a detected beacon.

The location service 110 may be connected to the readers 104 via a network. The network has a limited data bandwidth based on various factors known in network design. The readers 104 may receive beacon information multiple times a second, e.g., 5 times, 10 times, 15 times, from each detected beacon. In addition, multiple beacons may detect the same advertised beacon information from a single beacon. Prior art systems have transmitted every detected beacon information from every reader to a location service. Such a solution may tax the available network bandwidth. In some instances, the network bandwidth has become saturated with data from the readers. Redundant networks may be used to increase the available bandwidth, but comes with the cost of supporting and installing a second network. In some examples, the location services may be installed on a cruise ship or within an existing building, such as a hotel, hospital, etc., such that adding a second network may be cost prohibitive or physically impossible. In addition, given errors in accuracy in the distance determination results in the location service receiving low quality data. Combined with receiving all detected beacons, the errors in accuracy results in the location service receiving a large volume of low quality data.

To reduce the data traffic flow on a network, the readers 104 may implement various disclosed features. For example, the readers may detect beacons over a read delay period. The read delay period may be greater in length than the beacon information advertising rate, such that a beacon reader may receive multiple beacon information from a single beacon during the read delay period. As a specific example, beacon information may be transmitted ten times each second. The read delay period may be set to 0.5 seconds, 1 second, 5 seconds, etc. During the read delay period, the readers 104 detect advertised beacon information from the beacons 102. At the end of the read delay period, each reader 104 may transmit to the location service 110 a single detect indication for each detected beacon. This feature may result in a 10× to 30× reduction in data traffic.

The data provided to the location service 110 from the readers 104 may include a beacon identifier that identifies the detected beacon 102. In addition, a calculated distance between the reader 104 and the beacon 102 may also be included in the data provided to the location service 110. The calculated distance may be based on an average distance of the detected beacon during the read delay period. In another example, the distance may be the last detected distance. In yet another example, the distance may be an average distance of a last number of detections. For example, the last 50% of detected beacon information may be used to calculate the average distance, while ignoring the first 50% of detected beacon information in the average distance calculation.

The average distance calculation may also be used to determine if a beacon has moved more than a distance threshold since the last read delay period. If a beacon has not moved more than this distance threshold since the last read delay period, the beacon reader may choose not to provide an indication that the beacon was detected. In this example, the location service may determine the location of the beacon to be the last reported distance of the beacon. As an example, the distance threshold may be 1 meter; 3 meters; 5 meters; etc. The distance threshold may be based on a percentage of the previously reported distance. For example, the distance threshold may be 10%, 20%, 35%, etc., of the previously reported distance. In addition, the distance threshold may be set based on the features of the beacon reader. For example, a beacon reader may be able to determine an angle of approach or angle of departure of a beacon. These angles may allow the beacon reader to calculate a more accurate beacon distance, i.e., the distance between a beacon and a beacon reader that detects the beacon. The availability of a more accurate beacon distance may be used to reduce the distance threshold used.

The distance threshold may be used to help ensure a better quality of information is provided to the location service. For example, the accuracy of the beacon distance calculation may decrease as the distance between the beacon and the beacon reader increases. Accordingly, the distance threshold may be determined based on the average distance. If the beacon is determined to be close to the beacon reader, e.g., within 3 meters, the distance threshold may be set to a smaller value compared to when the beacon is determined to be further away, e.g, more 7 meters. This ensures that the beacon reader takes into account the accuracy of the distance calculation. Reporting to the location service when the beacon reader detects actual movement of the beacon means the location service is getting higher quality data compared to receiving all of the data from the beacon reader.

Another feature that may be used to reduce data traffic is the use of a read radius. Some known beacon reader technology loses accuracy as the beacon is farther away from the reader. For example, a distance calculation of a beacon that is within 5 meters of the reader may have an accuracy of +/−0.25 meters. Beacons that are detected to be 5-10 meters from the reader may have an accuracy of +/−3 meters. In some examples, beacons that are detected by a reader but are determined to be further away than a read radius from the reader may be ignored. Ignoring a detected beacon may mean that the reader ignores the detected beacon information in any average distance calculation. Another example is when the calculated average distance is greater than the read radius. In this example, ignoring the detected beacon means not sending an indication to the location service regarding the beacon when the calculated average distance is greater than the read radius.

Figure 2:
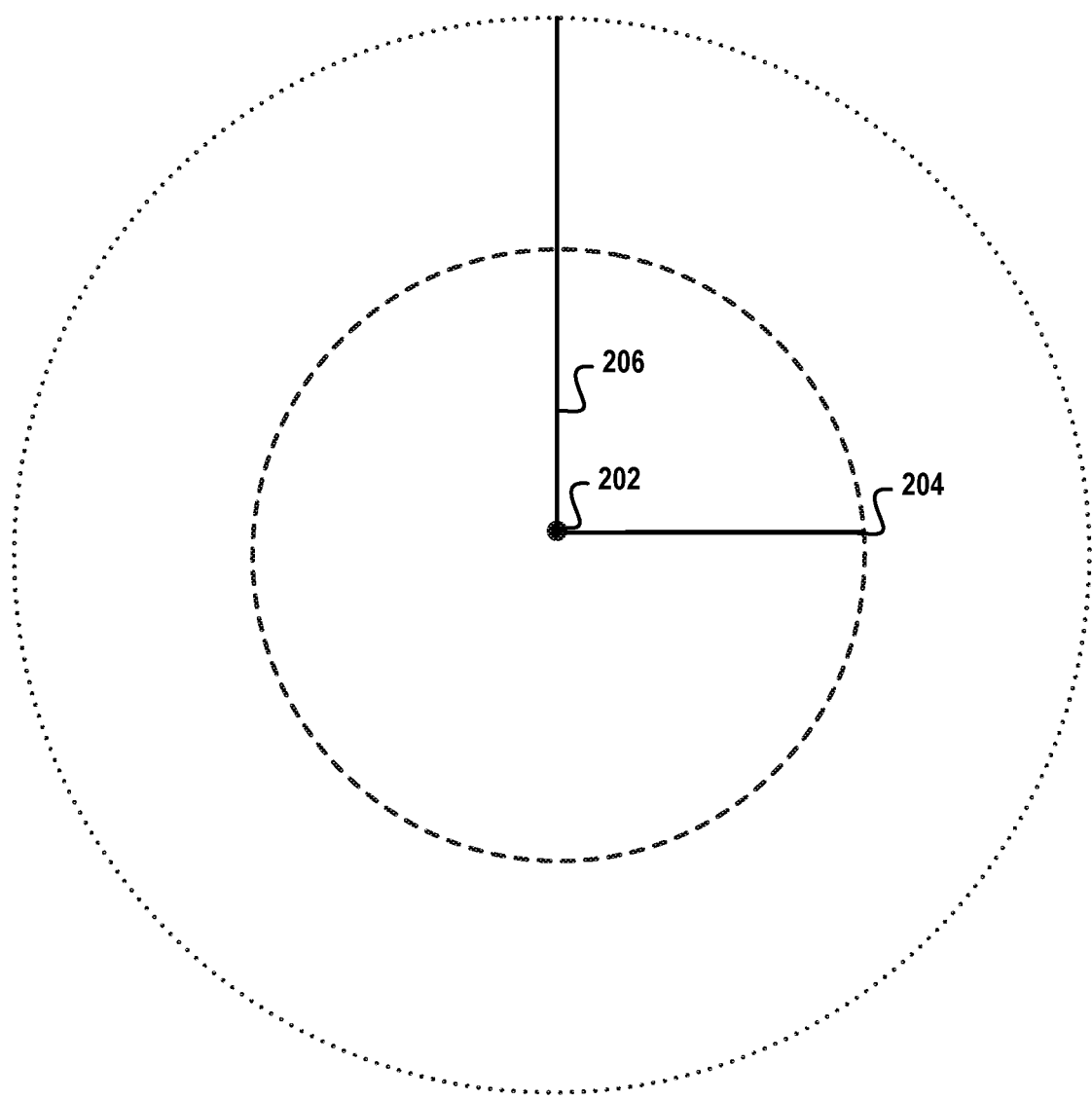
FIG. 2 is a diagram illustrating a read radius of a beacon reader in accordance with respective examples.

FIG. 2 is a diagram illustrating a read radius 204 of a beacon reader 202 in accordance with respective examples. The beacon reader 202 has a range 206. Typically, beacons within the range 206 have their broadcast beacon information detected by the beacon reader 202. The read radius 204 may be used to filter detected beacon information that is communicated from the beacon reader 202 to the location service. In an example, beacon readers are installed such that their read radiuses overlap providing coverage to the area of the location service. For example, cruise ships may have thousands of beacon readers installed throughout the cruise ship. To determine how far to separate beacon readers, the read radius of the beacon readers may be used to ensure complete coverage of the area. Not all beacon readers that are part of the location system may have the same read radius. For example, beacon readers in public areas that have a large traffic of beacons may use a read radius, while beacon readers in less trafficked areas may not use the read radius feature.

Some beacon readers may be equipped with technology that provides more accurate readings. Beacon readers that are able to determine an angle of approach or angle of departure of a beacon may be able to calculate more accurate distances compared to beacon readers without these features. In an example, the more accurate beacon readers may have a larger read radius. The more accurate beacon readers may be installed in common areas, larger areas, or areas where installation of beacon readers is challenging. The less accurate beacon readers may be installed in smaller areas, e.g., a hotel room, a cabin, etc.

Returning to FIG. 2, beacons that are detected within the read radius 204 during a read delay period may define the set of beacons that may be indicated to the location service. Beacons that are detected by the beacon reader 202 but are outside of the read radius 204 may be ignored by the beacon reader 202 in regard to providing an indication to the location service. Filtering detected beacons from being reported to a location service results in reduced data transmission over the location network.

Figure 3A:
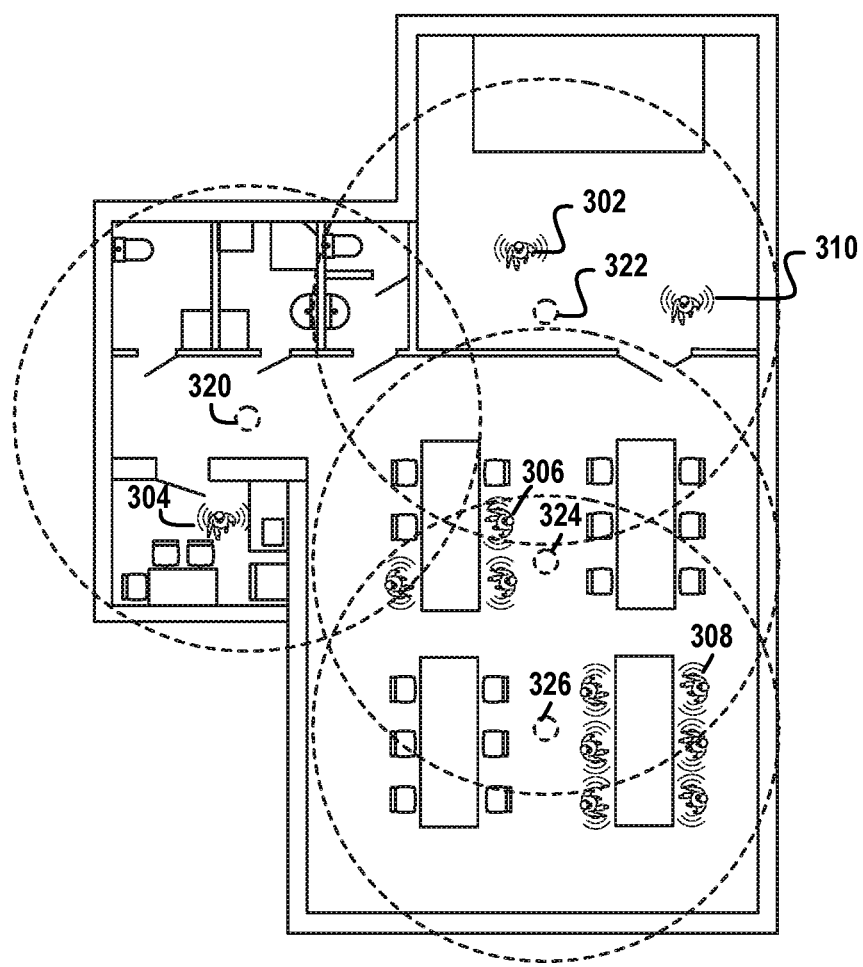
FIG. 3A and FIG. 3B are diagram illustrating an area covered by a location service using beacon readers in accordance with respective examples.
Figure 3B:
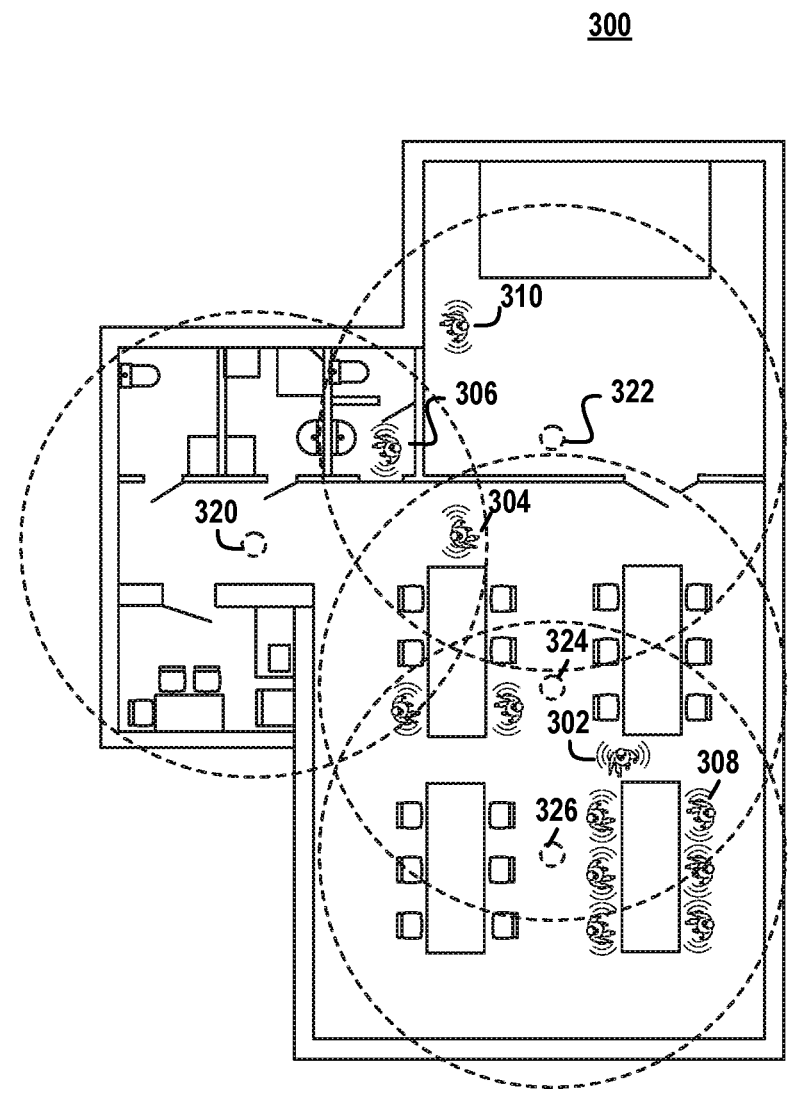

FIG. 3A and FIG. 3B are diagram illustrating an area 300 covered by a location service using beacon readers in accordance with respective examples. A location service (not shown) may be used to track locations of beacons that are within the area 300. Beacon readers 320, 322, 324, and 326 may be used to detect beacons 302, 304, 306, and 308 within the area 300. The dotted lines illustrate the range of each of the beacon readers 320, 322, 324, and 326. In FIGS. 3A and 3B more beacon readers may be installed within the area 300 to provide additional coverage. The beacons 302, 304, 306, and 308 may be worn by individuals or attached to equipment such as luggage, equipment, etc. The beacon readers 320, 322, 324, and 326 may implement various disclosed features to reduce data traffic on the network used by the location service.

FIG. 3A shows the area 300 at an initial time. FIG. 3B shows the area 300 at a later time. In an example, the initial time shows the location of individuals wearing beacons during a first read delay period. The later time of FIG. 3B shows the location of the individuals wearing beacons during a later read delay period. In an example, the later read delay period may be the read delay period immediately after the first read delay period.

The beacon readers 320, 322, 324, and 326 may provide a beacon identifier associated with each beacon detected by the beacon readers 320, 322, 324, and 326 during a read delay period. As an example, in FIG. 3A the beacon reader 324 may provide a beacon identifier associated with beacons 306 and 308. In another example, the beacon reader 324 may provide a beacon identifier associated with beacon 306 but not beacon 308. For example, the beacon 308 may be outside of the read radius or radius of concern of the beacon reader 324. The beacon reader 326 may provide the beacon identifier associated with the beacon 308 to the location service. The beacon reader 326 may also ignore the beacon 306 for being outside of the read radius or may provide the beacon identifier of the beacon 306 to the location service.

As way of illustration, FIG. 3A may be considered an initial time of the location system. In an initial read delay period, each beacon reader detects beacons within its range. For beacon information detected during the read delay period, each beacon reader calculates a distance between the beacon reader and the beacon. In some examples, a received signal strength (RSS) indicator may be used to calculate the distance. In addition, an RSS expected to be seen when a beacon is 1 meter away may be used to calculate the distance. The expected RSS will depend on the transmission power used by the beacon. Accordingly, in some example the beacon information received at the reader indicates the transmission power of the beacon. The beacon reader may use the transmission power of the beacon along with the RSS to calculate the distance to the beacon.

At the time shown in FIG. 3A, during an initial read delay period the beacon reader 320 may detect the beacon 304; the beacon reader 322 may detect the beacon 302; the beacon reader 324 may detect the beacons 306 and 308; and the beacon reader 326 may detect the beacons 306 and 308. After the initial read delay, each of the beacon readers 320, 322, 324, and 326 may calculate the distance between the beacon reader and the detected beacon for each beacon information received from a beacon. The average distance during the initial read delay period may then be calculated. In this example, the beacon readers have not yet reported on any beacon distance, the distance of each beacon may be reported to a location service. In addition, the average distance is stored to later determine if a detected beacon is reported to the location service. A timestamp may also be stored that indicates the time when the beacon was last reported to the location service. An initial timestamp that indicates the first time the beacon was reported to the location service may also be stored. This initial timestamp may be used to determine how long a beacon has stayed relatively in the same position. In various examples, the same position allows some movement, via the distance threshold, and is a proximity distance and not a specific location. Accordingly, a beacon could move in a way that its distance from the beacon reader doesn't change, e.g., in a circle around the beacon reader, and the beacon would be considered to be in the same distance from the reader.

FIG. 3B illustrates the same area 300 at a later time compared to FIG. 3A. As an illustrative example, the time in FIG. 3B may be at the end of the read delay period immediately after the time in FIG. 3A. The beacon reader 322 may detect the beacons 304, 306, and 310. In regard to the beacon 310, the beacon reader 322 calculates the distance from the beacon reader 322 and the beacon 310 for each beacon information received from the beacon 310 during the read delay period. The average distance away for the beacon 310 may then be calculated using the calculated distances. The average distance may then be compared with the previously calculated average distance of beacon 310 in regard to the beacon reader 322. If the beacon 310 has moved more than a distance threshold, the beacon reader 322 will report the update distance of the beacon 310 to the location service. In this example, the beacon 310 has moved more than the distance threshold and the beacon reader 322 provides a distance update of the beacon 310 to the location service. The distance update may include a beacon identifier of the beacon 310 and the calculated distance. The distance update may also include additional information such as an indication of how the distance was calculated; a received signal strength; a battery level indicator of the beacon; a minimum and maximum distance value during the read period; etc.

In other examples, a different distance calculation is used rather than the average distance during the entire read delay period. For example, the last received beacon information during the read delay period may be used to calculate the position. In another example, a last number of beacon information data may be used. For example, if a read delay period may be long enough to receive ten separate beacon information from a beacon, the last two, three, five, etc., may be used to calculate a distance. In yet another example, the beacon information received in a portion of the read delay period may be used. For example, all beacon information received in the last 20%, 50%, 75%, etc., may be used to determine the distance to the beacon. In yet another example, the distance calculations for individual beacon information may be weighted. For example, beacon information received later in the read delay period may be weighted more than earlier received beacon information. For example, a time within the read delay period when the beacon information was received may be used to weight the beacon information. Accordingly, later beacon information whose distance may more accurately reflect the final distance of the beacon within a read delay period, may have more weight in calculating a distance from the beacon compared to earlier beacon information. The weights may also be based on the distance value itself. In some examples, closer distances have less error and therefore may be weighted more than further distances. The weight may also be based on a combination of time and distance.

The beacon reader 322 may also detect beacons 304 and 306 during the read period. The beacons 304 and 306 may not be detected for the entirety of the read period. For example, the beacon 304 may have entered the range of the beacon reader 322 during a later portion of the read delay period. At the end of the read delay period, the beacon reader 322 determines that beacons 304 and 306 were not detected in the previous read delay period. Accordingly, the beacon reader 322 may provide an entry indication to the location service. The entry indication provides data to the location service that the beacon 304 has entered the range of the beacon reader 322 since the previous read delay period. An entry indication may also be sent for the beacon 306. The beacon reader 322 may also send a distance update to the location service with an indication of the distance between the beacon reader 322 and the beacon. The distance update and the entry indication may be combined in a single message.

The beacon reader 322 may also send an abandon indication to the location service in regard to the beacon 302. The beacon 302 was previously detected in the range of the beacon reader 322 but was not seen in the later read delay period. The exit indication provides the location service with information that the beacon 302 has moved out of range of the beacon reader 322.

The beacon reader 320 may also send an entry indication in regard to the beacon 306. In addition, the beacon reader 320 may send a distance update in regard to the beacon 304. In some examples, the beacon reader 320 may use a read radius or a radius of concern. The read radius is a range that is smaller than the range of the beacon reader 320. For example, the beacon 304 may be within the range of the beacon reader 320 but outside of the read radius. In this example, the beacon reader 320 may provide an exit indication in regard to the beacon 304 to the location service. The exit indication tells the location service that the beacon 304 is within range of the beacon reader 320 and detected, but is outside of the read radius. The beacon reader 320 may send an initial exit indication and refrain from sending additional exit indications while the beacon 304 remains outside of the read radius. Once the beacon 304 leaves the range of the beacon reader 320, the beacon reader 320 may send an abandon indication to the location service. In later read delay periods, if the beacon 304 comes within the read radius, the beacon reader 320 may send an entry indication.

The beacon reader 324 may provide an entry indication to the location service for the beacons 302 and 304 and an abandon indication in regard to the beacon 306. The beacon reader 324 also detects the beacon 308 during the read delay period. The beacon 308, however, has not moved since the last read delay period. Accordingly, the distance of the beacon 308 from the beacon reader 324 is the same or approximate to the previously calculated distance. The difference between these two values is less than the distance threshold, such that the beacon reader 324 does not provide a distance update to the location service. Accordingly, the location service assumes that the distance of the beacon 308 is the same from the previously reported distance. The location service, therefore, correctly knows the distance of the beacon 308 without receiving any additional information from the beacon reader 324.

The beacon reader 326 also determines to not send a distance update in regard to the beacon 308. The beacon reader 326 also sends an entry indication in regard to the beacon 302 and an abandon indication in regard to the beacon 306.

Beacon readers may also provide a linger indication to the location service for beacons that do not deviate from previous distances. For example, the beacon 308 may not move for 20 minutes. During this 20 minutes there may be 20 read delay periods of one minute each. In other examples, the read delay periods may be smaller, such as every 1 second; 5 seconds; or 10 seconds. A linger threshold may be configured to be 5 minutes. In this example, the beacon distance is initially calculated for a beacon and a beacon reader, such as the beacon reader 326. This initial beacon distance along with a timestamp may be stored. In the next four read delay periods, the difference between the calculated beacon distance of the beacon 308 and the stored initial beacon distance remains less than the distance threshold. Because the difference is less than the distance threshold, the beacon reader 326 does not provide a distance update to the location service. On the fifth read delay, the difference in the beacon distance calculation with the initial beacon distance is also below the distance threshold. Without a linger indication, the beacon reader 326 would not provide a distance update. With a linger indication, the beacon reader also calculates a difference of a current time and the timestamp of the initial beacon distance. If this difference is above the linger threshold, the beacon reader 326 provides a linger indication to the location service. The linger indication may indicate the beacon identifier and a linger flag. In another example, the linger indication may be a distance update with a set linger flag. In another example, a counter is used to determine when to send the linger indication. For example, a counter may be incremented when a beacon is determined to be stationary. If the counter reaches the linger threshold, the linger indication may be sent. The counter would be reset if the beacon has moved more than the distance threshold. The counter could also count down rather than up, such that when the counter reaches zero the linger indication is sent.

Figure 4:
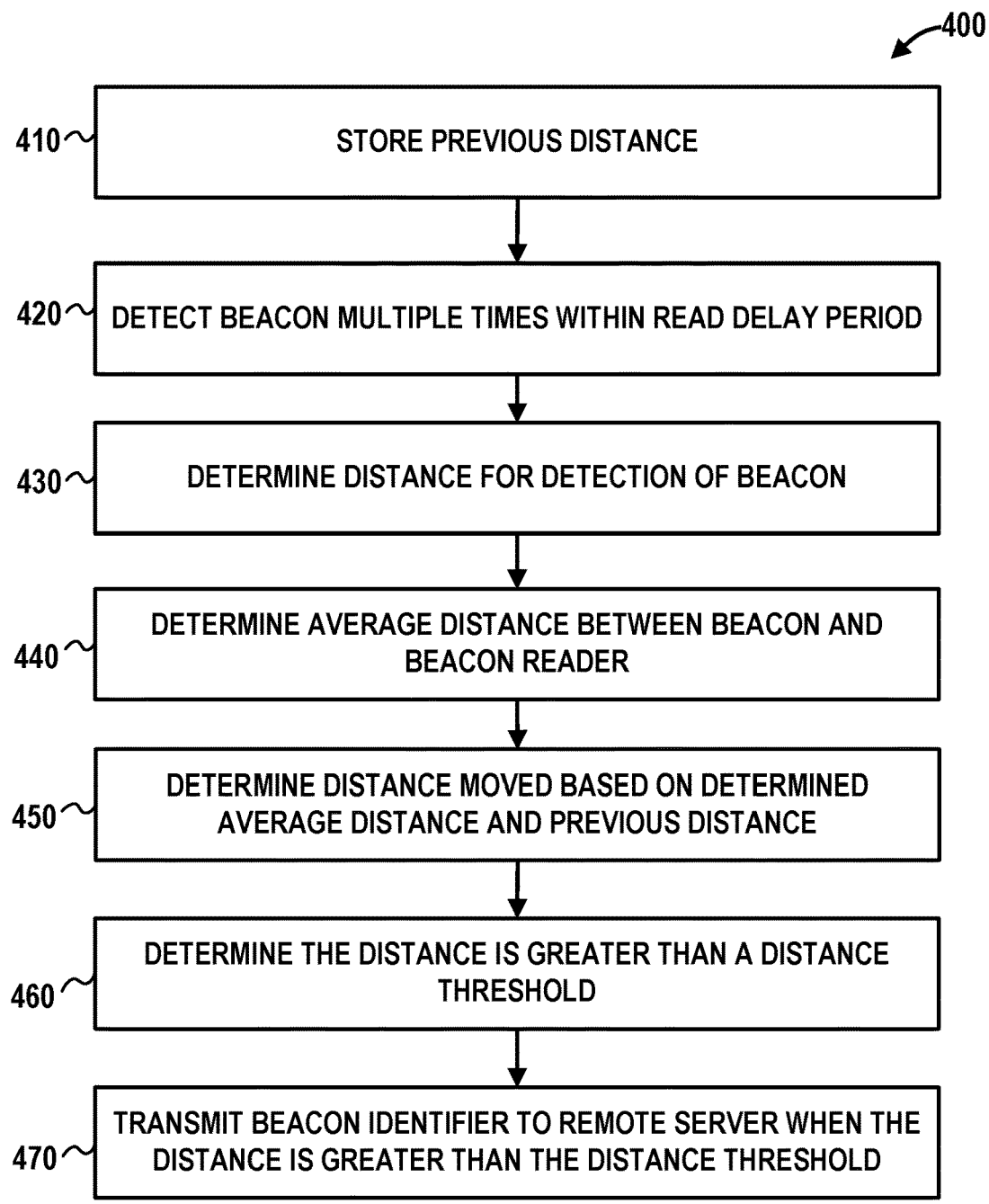
FIG. 4 is a diagram illustrating a flow diagram of a process for reducing network data traffic from a beacon reader in accordance with respective examples.

FIG. 4 is a diagram illustrating a flow diagram of a process for reducing network data traffic from a beacon reader in accordance with respective examples. The process 400 may be executed on a computing device. The process 400 may be used by a beacon reader to reduce network traffic regarding detected beacons while still providing timely and useful proximity/distance updates to a location service.

At 410, a previous distance of a beacon from a beacon reader determined based on a previous read delay period of time is stored. For example, the beacon reader may detect the beacon during the previous read delay period. The beacon reader may calculate an average beacon distance based on beacon information received by the beacon reader in the previous read delay period.

At 420, the beacon reader detects two or more beacon information from the beacon during a read delay period of time. The read delay period of time may be the read delay period of time that immediately follows the previous read delay period. The length of the read delay period may be configurable. For example, the duration of the read delay period may be based on if the beacon reader is able to determine the angle of approach or the angle of departure of beacons. The read delay period may be decreased based on this determination. In another example, to further reduce network traffic, the read delay period may be increased based on this determination. The beacon information may include a beacon identifier. In addition, the beacon information may include a transmit power or other information that is transmitted from a beacon via known protocols such as iBeacon and Eddystone.

At 430, a distance between the beacon reader and the beacon for each of the two of more beacon information is determined. In an example, for each detected beacon information the beacon reader may calculate a beacon distance. In other examples, a subset of the detected beacon information may be used to calculate distances. For example, beacon information received in the second half of the read delay period may be used, while ignoring earlier received beacon information. As another example, every other beacon information may be used to calculate distances.

At 440, an average distance based on the determined distances between the beacon reader and the beacon for each of the two or more beach information is determined. The average distance may be the mean or medium of the calculated distances. In another example, the average distance is calculated using weighted calculated distances. For example, the calculated distances may be weighted based on when within the read delay period the corresponding beacon information was detected. Beacon information received later in the read delay period may be weighted more than earlier beacon information.

At 450, a distance moved from the average distance and the previous distance of the beacon is determined. As an example, the absolute value of the difference between the average distance and the previous distance may be the distance moved. At 460, the distance moved is determined to be greater than a predetermined distance threshold. The distance threshold may be based on the capabilities of the beacon reader, the calculated average distance, the previously stored distance, or a combination of these. For example, as the accuracy of the beacon reader is greater when beacons are closer, the distance threshold may be less when the beacon is near compared to when the beacon is further away. In an example, the distance threshold may be determined as a percentage of the distance. Using a percentage of the distance results in a smaller distance threshold as the beacon is closer to the reader. Accordingly, the beacon reader may adapt based on the accuracy of the distance determination. The new average distance may be stored in memory to determine future movement of the beacon in later read delay periods.

At 460, the beacon reader transmits to a remote server a beacon identifier based on the beacon information based on the determining the distance moved is greater than the predetermined distance threshold.

After the read delay period described above, the beacon reader continues to detect beacons over time using read delay periods. In an example, in a later read delay period after the read delay period above, two or more beacon information from the beacon are detected by the beacon reader. A second distance between the beacon reader and the beacon is determined for each of the two or more beacon information. The second distance may be calculated as described above. A second average distance between the beacon reader and the beacon is determined from the calculated second distances. A distance moved by the beacon is calculated using the average distance and a previous distance of the beacon. The previous distance of the beacon may be the distance that was stored from the read delay period described above. The distance moved may be less than the predetermined distance threshold. When the distance moved is less than the predetermined distance threshold, the beacon reader does not provide a beacon identifier of the beacon to the remote server. The decision to not provide the beacon identifier, effectively, filters this data from the remote server. Accordingly, less data network traffic is consumed and less processing power and memory of the remote server is used.

In another example, the beacon reader may determine that the beacon has not moved more than the threshold distance for more than a linger threshold. The beacon reader may use timestamps or counters to determine a liner time of the beacon. The linger time in an indication of an amount of time since the beacon was last transmitted to the remote server. If the linger time is more than a linger threshold, e.g, 5 seconds; 30 seconds; 1 minute; a multiple of the beacon advertising rate; etc., the beacon reader may transmit the beacon identifier of the beacon to the remote server. The linger threshold ensures that the beacon reader provides the remote server with updated information even if the beacon does not move for a period of time. Even with such a linter function, the amount of data transmitted is reduced compared to a beacon reader that provides updates for each received beacon advertisement, e.g., beacon information.

As another feature to reduce data network traffic, a beacon reader may use a read radius, which may also be referred to as a radius of concern. Detected beacons outside of the read radius may be ignored by the beacon reader. The read radius is some value that is less than the range of the beacon reader. In some examples the read radius is determined based on an ability of the beacon reader to determine an angle of approach or an angle of departure of beacons. These angle values allow for more accurate distances measurements when the beacon is farther away from the beacon reader. Accordingly, the read radius may be increased for beacon readers that support these angle features compared to beacon readers that do not.

The beacon reader supporting the angle of approach and angle of departure may also be used to configure one or more other parameters such as the read delay period or the distance threshold. For example, the distance threshold may be reduced and the read delay period may also be reduced.

A beacon that is outside of the read radius is ignored even if the beacon has moved more than the distance threshold in a read delay period. In one example, each distance calculated from a received beacon information that is greater than the read radius may be filtered. In this example, distances longer than the read radius are filtered from the average distance calculation. As another example of a read radius, the average distance of beacon may be calculated without filtering any beacon information based on the read radius. The average distance may then be compared to the read radius. Any beacon whose average distance is greater than the read radius may then be filtered from reporting to the remote server.

When a read radius feature is used a beacon may entry, exit, and abandon a beacon reader. In an example, the entry state is when a beacon moves into the read radius of a beacon reader during a read delay period when the beacon was outside of the read radius or not detected by the beacon reader in the previous read delay. In another example, the entry state may be when a beacon is detected by the beacon reader when the beacon was not detected in the previous read delay period. This example applies when the beacon reader does not use a read radius feature. The beacon reader may detect beacons that have entered the entry state by looking at the beacons detected in the current read delay period that were not detected or outside of the read radius in the previous read delay period.

An exit indication may be provided to the remote server if the beacon has moved from within the read radius to outside of the read radius. For example, in an immediately previous read delay period a beacon could be within the read radius. In the next read delay period the beacon may be an average distance greater than the read radius. The beacon reader may determine that the beacon was within the read radius during the previous read delay period and is now outside of the read radius. The beacon reader may provide an exit indication to the remote server. The exit indication indicates that the beacon has moved from being within the read radius to being outside of the read radius but still detected by the beacon reader. A beacon that is outside of beacon reader's range but was previously in range is indicated with an abandon indication.

An abandon indication may be used when a beacon moves outside of beacon reader's range. The beacon reader may determine beacons that were detected in the previous read delay period but not detected in a current read delay period. Any beacon that was not detected in the current read delay period is considered abandoned. The beacon reader may provide an abandoned indication to the remote server that indicates the beacons that are no longer in the beacon reader's range. In an example, the beacon reader may provide a list of abandoned beacons in a single abandon indication. In another example, an abandon indication for each abandoned beacon may be sent to the remote server.

Figure 5:
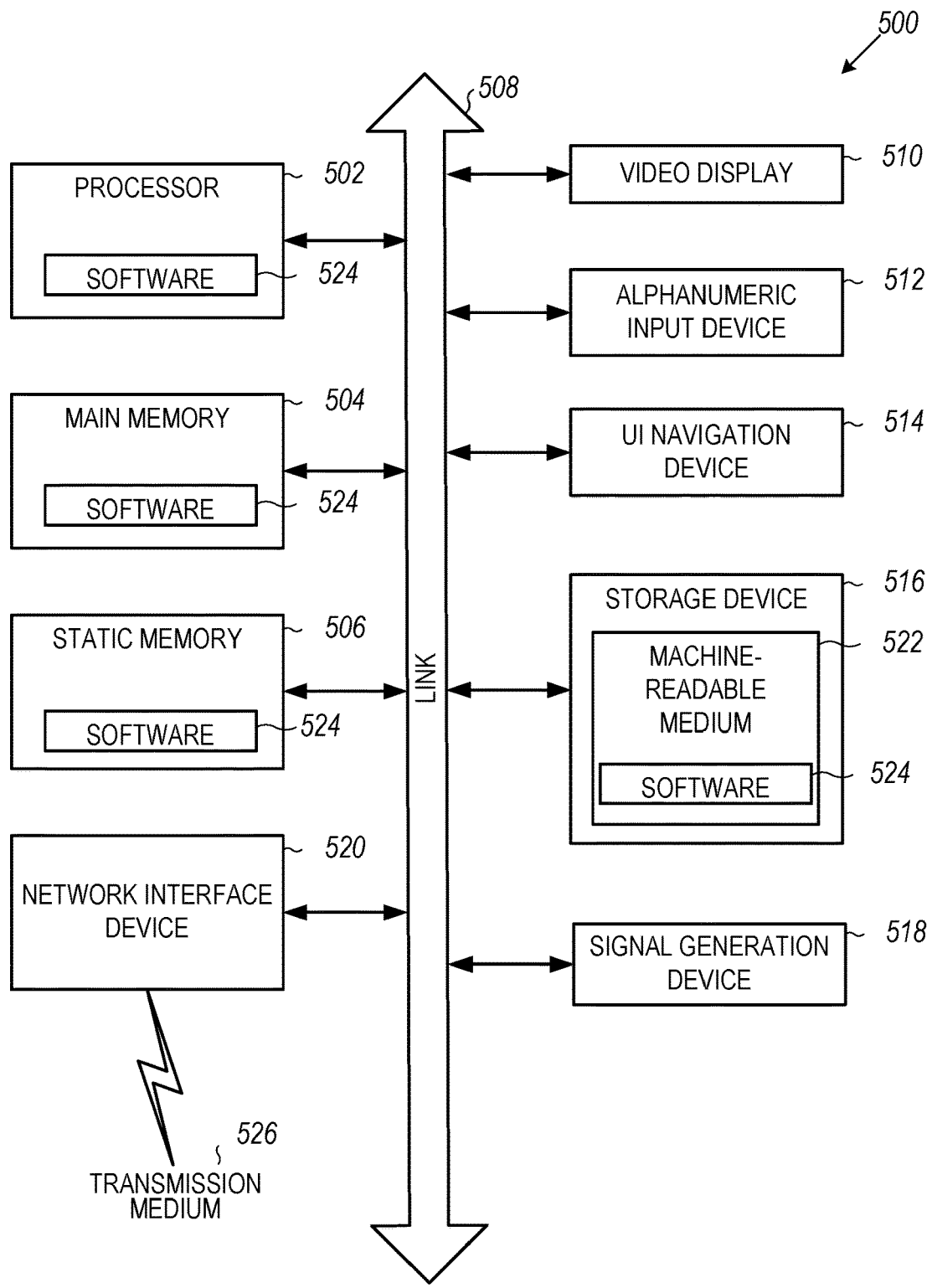
FIG. 5 is an example computing device that can be used in conjunction with the technologies described herein.

FIG. 5 is an example computing device that can be used in conjunction with the technologies described herein. In alternative embodiments, the computing device 500 may operate as a standalone device or may be connected (e.g., networked) to other computing devices. In a networked deployment, the computing device 500 may operate in the capacity of a server communication device, a client communication device, or both in server-client network environments. In an example, the computing device 500 may act as a peer computing device in peer-to-peer (P2P) (or other distributed) network environment. The computing device 500 may be a beacon reader, personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of a beacon reader 500, may implement components of the location engine, and perform the method of FIG. 4.

Computing device 500 may include a hardware processor 502 (e.g., a central processing unit (CPU), a graphics processing unit (GPU), a hardware processor core, or any combination thereof), a main memory 504 and a static memory 506, some or all of which may communicate with each other via a link (e.g., bus) 508. The computing device 500 may further include a display unit 500, an input device 512 (e.g., a keyboard), and a user interface (UI) navigation device 514 (e.g., a mouse). In an example, the display unit 510, input device 512, and UI navigation device 514 may be a touch screen display. In an example, the input device 512 may include a touchscreen, a microphone, a camera (e.g., a panoramic or high-resolution camera), physical keyboard, trackball, or other input devices.

The computing device 500 may additionally include a storage device (e.g., drive unit) 516, a signal generation device 518 (e.g., a speaker, a projection device, or any other type of information output device), a network interface device 520, and one or more sensors, such as a global positioning system (GPS) sensor, compass, accelerometer, motion detector, or other sensor. The computing device 500 may include an input/output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 516 may include a computing-readable (or machine-readable) storage media 522, on which is stored one or more sets of data structures or instructions 524 (e.g., software) embodying or utilized by any one or more of the techniques or functions described herein. In an example, at least a portion of the software may include an operating system and/or one or more applications (or apps) implementing one or more of the functionalities described herein. The instructions 524 may also reside, completely or at least partially, within the main memory 504, within the static memory 506, and/or within the hardware processor 502 during execution thereof by the computing device 500. In an example, one or any combination of the hardware processor 502, the main memory 504, the static memory 506, or the storage device 516 may constitute computing device (or machine) readable media.

While the computer-readable storage media 522 is illustrated as a single medium, a "computer-readable storage media" or "machine-readable storage media" may include a single medium or multiple media (e.g., a centralized or distributed database, and/or associated caches and servers) configured to store the one or more instructions 524.

In an example, a computer-readable storage media or machine-readable storage media may include any medium that is capable of storing, encoding, or carrying instructions for execution by the computing device 500 and that cause the computing device 500 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 520 may use the transfer protocols to transmit data using transitory propagating signals.

In an example, the network interface device 520 may include one or more physical jacks (e.g., Ethernet, coaxial, or phone jacks) or one or more antennas to connect to the communications network 526. In an example, the network interface device 520 may include one or more wireless modems, such as a Bluetooth modem, a Wi-Fi modem or one or more modems or transceivers operating under any of the communication standards mentioned herein. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. In an example, a transmission medium may include any intangible medium that is capable of storing, encoding or carrying instructions for execution by the computing device 500, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for reducing network data traffic from a beacon reader, the method comprising operations performed using an electronic processor, the operations comprising:
    storing a previous distance of a beacon from the beacon reader determined based on a previous read delay period of time;
    detecting, at the beacon reader, two or more beacon information from the beacon during a read delay period of time;
    determining, at the beacon reader, a distance between the beacon reader and the beacon for each of the two of more beacon information;
    determining, at the beacon reader, an average distance based on the determined distances between the beacon reader and the beacon for each of the two or more beacon information;
    determining, at the beacon reader, a distance moved from the average distance and the previous distance of the beacon;
    determining, at the beacon reader, the distance moved is greater than a predetermined distance threshold; and
    transmitting, from the beacon reader to a remote server, a beacon identifier based on the determining the distance moved is greater than the predetermined distance threshold.

2. The method of claim 1, further comprising:
    determining the distance for one of the beacon information is greater than a read radius distance; and
    filtering the one of the beacon information from the average distance determination based on the distance for one of the beacon information is greater than the read radius distance.

3. The method of claim 1, further comprising:
    determining a second average distance between the beacon and the beacon reader during a second read delay period of time;
    determining the second average distance is greater than a read radius; and
    filtering the beacon from the distance moved determination based on the determining the second average distance is greater than the read radius.

4. The method of claim 1, further comprising:
    determining a second average distance between the beacon and the beacon reader during a second read delay period of time;
    determining the second average distance is greater than a read radius;
    determining the beacon was within the read radius in a second previous read delay period of time;
    transmitting an exit indication of the beacon identifier to the remote server based on the determining the second average distance is greater than the read radius and the determining the beacon was within the read radius in the second previous read delay period of time.

5. The method of claim 3, further comprising determining the read radius based on an ability of the beacon reader to determine an angle of approach or an angle of departure of beacons.

6. The method of claim 1, further comprising:
    detecting two or more beacon information from the beacon during a second read delay period of time;
    determining a second distance between the beacon reader and the beacon for each of the two of more beacon information from the second read delay period of time;
    determining a second average distance based on the determined second distances between the beacon reader and the beacon;
    determining a second distance moved from the average distance and a second previous distance of the beacon; and
    determining the second distance moved is less than the predetermined distance threshold.

7. The method of claim 6, further comprising determining to not transmit the beacon identifier based on the beacon information to the remote server based on the determining the second distance moved is less than the predetermined distance threshold.

8. The method of claim 6, further comprising:
    determining a linger time as an indication of the amount of time since the beacon identifier was last transmitted to the remote server;
    determining the linger time is above a predetermined linger threshold; and
    transmitting the beacon identifier to the remote server based on the determining the linger time is above the predetermined linger threshold.

9. The method of claim 1, further comprising determining the predetermined distance threshold based on the average distance or the previous distance.

10. The method of claim 9, wherein the predetermined distance threshold is less when the average distance is closer to the beacon reader compared to further away from the beacon reader.

11. The method of claim 1, further comprising determining the read delay period of time based on an ability of the beacon reader to determine an angle of approach or an angle of departure of beacons.

12. The method of claim 1, further comprising:
    detecting second information from a second beacon during the read delay period of time;
    determining the second beacon was not detected in the previous read delay; and
    transmitting an entry indication of the second beacon to the remote server based on the determining the second beacon was not detected in the previous read delay.

13. The method of claim 1, further comprising:
    determining the beacon was not detected during a second read delay period of time;
    transmitting an abandon indication of the beacon identifier to the remote server based on not detecting the beacon during the second read delay period of time.

14. The method of claim 1, further comprising determining predetermined distance threshold based on an ability of the beacon reader to determine an angle of approach or an angle of departure of beacons.

15. A system comprising:
an electronic processor of a beacon reader configured to:
store a previous distance of a beacon from the beacon reader determined based on a previous read delay period of time;
detect, at the beacon reader, two or more beacon information from the beacon during a read delay period of time;
determine a distance between the beacon reader and the beacon for each of the two of more beacon information;
determine an average distance based on the determined distances between the beacon reader and the beacon for each of the two or more beacon information;
determine a distance moved from the average distance and the previous distance of the beacon;
determine the distance moved is greater than a predetermined distance threshold; and
transmit, from the beacon reader to a remote server, a beacon identifier based on the determining the distance moved is greater than the predetermined distance threshold.

16. The system of claim 15, wherein the electronic processor is further configured to:
determine a second average distance between the beacon and the beacon reader during a second read delay period of time;
determine the second average distance is greater than a read radius; and
filter the beacon from the distance moved determination based on the determining the second average distance is greater than the read radius.

17. The system of claim 16, wherein the electronic processor is further configured to:
detect two or more beacon information from the beacon during a second read delay period of time;
determine a second distance between the beacon reader and the beacon for each of the two of more beacon information from the second read delay period of time;
determine a second average distance based on the determined second distances between the beacon reader and the beacon;
determine a second distance moved from the average distance and a second previous distance of the beacon;
determine the second distance moved is less than the predetermined distance threshold; and
determine to not transmit the beacon identifier based on the beacon information to the remote server based on the determination that the second distance moved is less than the predetermined distance threshold.

18. A non-transitory computer-readable storage medium storing computer-executable instructions that when executed by a processor of a beacon reader cause the process to perform operations comprising:
storing a previous distance of a beacon from the beacon reader determined based on a previous read delay period of time;
detecting, at the beacon reader, two or more beacon information from the beacon during a read delay period of time;
determining a distance between the beacon reader and the beacon for each of the two of more beacon information from the read delay period of time;
determining an average distance based on the determined distances between the beacon reader and the beacon for each of the two or more beacon information;
determining a distance moved from the first average distance and the previous distance of the beacon;
determining the distance moved is greater than a predetermined distance threshold; and
transmitting, from the beacon reader to a remote server, a beacon identifier based on the determining the distance moved is greater than the predetermined distance threshold.

19. The non-transitory computer-readable storage medium of claim 18, wherein the operations further comprise:
determining a second average distance between the beacon and the beacon reader during a second read delay period of time;
determining the second average distance is greater than a read radius; and
filtering the beacon from a second distance moved determination based on the determining the second average distance is greater than the read radius.

20. The non-transitory computer-readable storage medium of claim 19, wherein the operations further comprise:
detecting two or more beacon information from the beacon during a second read delay period of time;
determining a second distance between the beacon reader and the beacon for each of the two of more beacon information from the second read delay period of time;
determining a second average distance based on the determined second distances between the beacon reader and the beacon;
determining a second distance moved from the average distance and a second previous distance of the beacon;
determining the second distance moved is less than the predetermined distance threshold; and
determining to not transmit the beacon identifier based on the beacon information to the remote server based on the determination that the second distance moved is less than the predetermined distance threshold.

* * * * *